United States Patent [19]

DeTreville

[11] Patent Number: 6,078,740
[45] Date of Patent: Jun. 20, 2000

[54] ITEM SELECTION BY PREDICTION AND REFINEMENT

[75] Inventor: John D. DeTreville, Menlo Park, Calif.

[73] Assignee: Digital Equipment Corporation, Maynard, Mass.

[21] Appl. No.: 08/740,737

[22] Filed: Nov. 4, 1996

[51] Int. Cl.[7] ............................. G06F 19/00; G05B 17/00
[52] U.S. Cl. ..................... 395/500.43; 705/26; 705/10
[58] Field of Search ................. 395/500, 200.48, 395/200.49; 705/26, 10

[56] References Cited

U.S. PATENT DOCUMENTS

| | | | |
|---|---|---|---|
| 4,870,579 | 9/1989 | Hey | 364/419 |
| 4,996,642 | 2/1991 | Hey | 364/419 |
| 5,041,972 | 8/1991 | Frost et al. | 364/401 |
| 5,124,911 | 6/1992 | Sack | 364/401 |
| 5,450,314 | 9/1995 | Kagami et al. | 364/148 |
| 5,630,159 | 5/1997 | Zancho | 395/200.51 |
| 5,633,484 | 5/1997 | Zancho et al. | 235/380 |
| 5,657,450 | 8/1997 | Rao et al. | 707/10 |
| 5,724,567 | 3/1998 | Rose et al. | 395/1 |
| 5,727,129 | 3/1998 | Barrett et al. | 395/1 |
| 5,774,868 | 6/1998 | Cragun et al. | 705/10 |

Primary Examiner—Kevin J. Teska
Assistant Examiner—Kyle J. Choi
Attorney, Agent, or Firm—Pennie & Edmonds LLP; Dirk Brinkman

[57] ABSTRACT

In a computerized method for predicting a particular user preference for an item based on observations made about the item by other users, client computers are used to enter the observations about the items. The observations are forwarded to a server computer via a network. The observations are collected in a database of the server computer. Using factor analysis, a solver module of the server computer analyzes the observations to generate a model of the observations. The models are distributed to the client computers via the network. The client computer makes predictions of preferences of the particular user using the models.

12 Claims, 2 Drawing Sheets

ITEM SELECTION BY PREDICTION AND REFINEMENT

FIELD OF THE INVENTION

The present invention relates generally to predicting and recommending items not yet sampled by a particular user, and more particularly to selecting unsampled items based on observations made about the items by other users.

BACKGROUND OF THE INVENTION

In a number of situations, it would be helpful to be able to predict which items can be recommended to users. More particularly, it would be helpful to systematically recommend items to users who have not had an opportunity to sample the items.

For example, with the rapid growth of the Internet, and other distributed computer services, the amount of multimedia content items available to users has expanded enormously. Multimedia content can include news, product information, advertisements, resumes, graphics, photographs, music, games, databases, and so forth. For example, it is estimated that the number of "pages" accessible to users via the worldwide-web (WWW) is measured in tens of millions, and growing every day.

The total collection of items available through the Internet has reached a volume that far exceeds a user's ability to quickly select items that may be of particular interest. There are many known approaches to predicting items that closely match a particular user's interests.

In some prior art preference selection systems, see for example the FIREFLY music selection system at Internet address:

"http://www.firefly.comhtml/about.html,"

users can share music item preferences with each other. The preferences are captured as observation samples. For example, user A likes items 351 and 1024 very much, and user B likes item 351 very much. These observation samples are analyzed by the system to synthesize recommendations, for example, for user B to try item 1024. As the number of samples becomes large, the recommendations can become better. The system allows users to spend time and money on items that are more likely to be of interest, and avoid items that probably have less appeal. Thus, the system brings value to the users as well as to those offering the goods, services, and information.

The problem with most prior art preference selection systems is that the user/item interaction needs to be centralized. Furthermore, the interactions with the system are explicit, and require a substantial amount of user cooperation. For example, most preference selection mechanisms require the tedious preparation of "profiles" of user interests. A profile is a measurement of a subjective reaction to an item by a user. Such mechanisms have limited effectiveness, since they require a relatively high level of user cooperation. Furthermore, this type of profiling is time consuming, and often applied to out-of-date material. Clearly, in a rapidly evolving market place such as the Internet, this type of selection mechanism is unworkable.

Therefore, there is a need for an item selection system which can more accurately predict user tastes for selected unsampled items. In addition, it should be possible to continuously refine the prediction and selection parameters as users interact with the system.

SUMMARY OF THE INVENTION

The system according to the invention uses statistical techniques to predict how well a particular consumable item will match a particular user's interests and needs. The system builds preference models expressed as, for example, data structures stored in a memory. The models are built from observation samples supplied by users.

The models allows the system to automatically group users with items into compatible applicable areas of interest. As opposed to the prior art, where the categorizations are fixed, the system according to the invention allows a flexible categorization. This means that the models can be adjusted as user's interests and needs shift, and as the total set of items is continuously changing, as for example, on the Internet.

As the system receives user observations, or feedback on past recommendations generated by the system, new recommendations can be synthesized, and immediately distributed to selected users based on their common needs and interests as observed in the past, e.g., as expressed by the stored models.

In one aspect of the invention, client computers are used to enter observations made about the item by other users. The observations are collected in a database of a server computer. The observations are analyzed using statistical inference methods such as factor analysis to generate models of the observations. The models are distributed to the clients so that the client computers can predict the preference of a particular user for items observed by other users.

DETAILED DESCRIPTION OF THE PREFERRED EMBODIMENT

Figure 1:
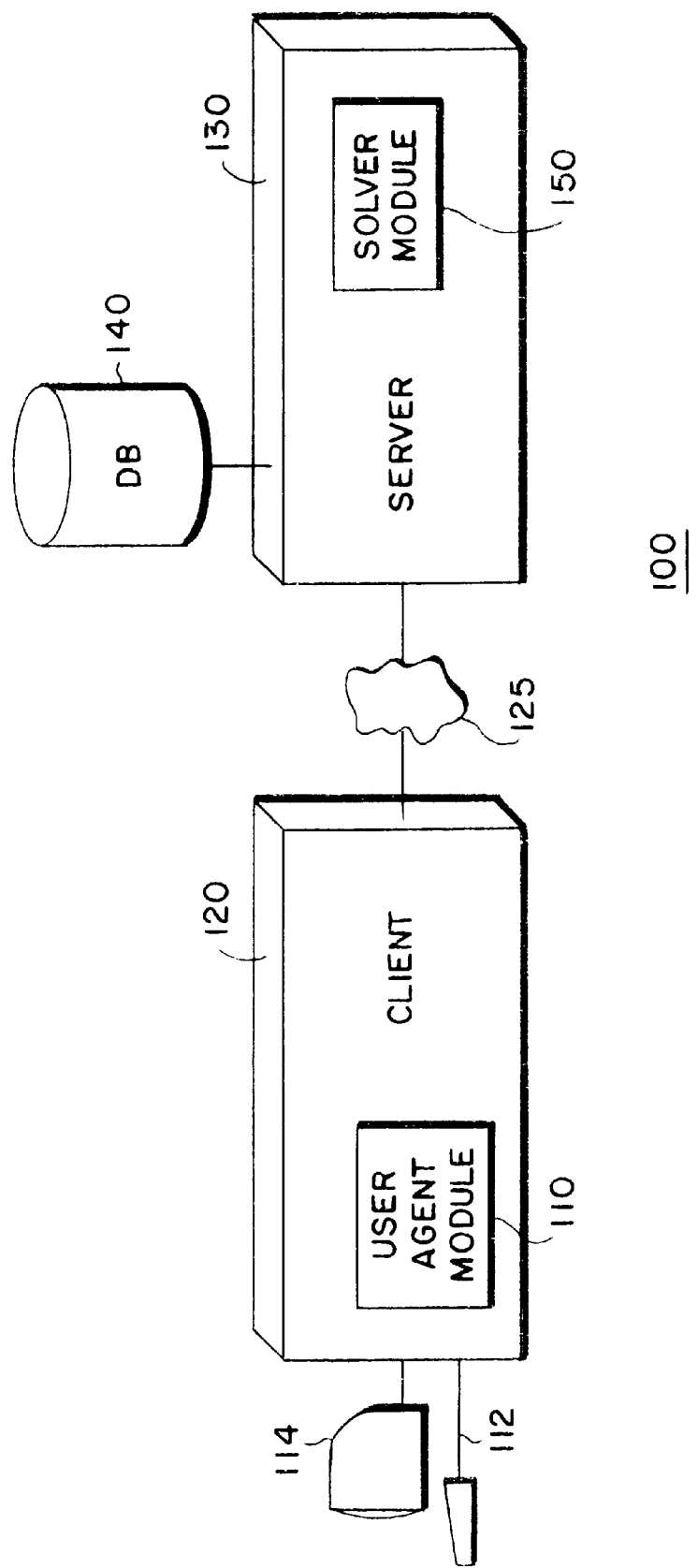
FIG. 1 shows a computer system which uses the invention.

FIG. 1 shows an item prediction and selection system 100 according to a preferred embodiment of the invention. The system 100 can be used to predict which items would be of interest to a particular user. The prediction is based on observation samples made about the items by other users, and observation samples made by the user about other similar items. In the preferred embodiment of the invention, the system 100 is distributed. Distributed means that the system components are typically interconnected via a network.

The system 100 includes a client system 120 including a user agent module 110. The client 120 can be connected, via a network 125, to a server system 130. The server 130 includes a database 140 and a solver module 150.

The client 120 can be configured as a PC or workstation. The client 120 can include an input device 112, for example, a mouse or a keyboard, and an output device 114, for example, a display terminal. The user of the client 120 can use the input device 112 to enter observations about items. Predictions about items of likely interest to the user can be displayed on the output device 114. The client 120 can also include memories for storing programs and data structures used by the client 120, for example, the user agent 110.

The interactions can be facilitated by graphic user interfaces using the I/O devices 112 and 114. The client 120 can be placed at a location where users select items, for example a "kiosk" in a record or video store. Alternatively, the client 120 can be located at a user's premises. The client 120 might be a portable or hand-held computer. The user interacts with the agent 110 for the purpose of selecting items, and indicating preferences about items, e.g., observations. In response to the selections and observations, the user receives preference predictions.

The network 125 can be a local (private), or wide area (public) network, such as the Internet. The network 125 is configured to communicate control and data messages between the client 120 and the server 130. In an implementation, the network 125 may connect a plurality of concurrently operating clients 120 with the server 130. Typically, the server system 130 is located remotely from the client 120. The server 130 does not need to be connected to the clients 120 at all times, even while the clients 120 are operating. Furthermore, communications between the client and the server does not need to be bi-directional.

The server 130 can include a processor and memory for executing the steps of processes of the solver module 150. The solver module 150 can be implemented as software programs operating on data structures stored in memories of the server 130.

The database 140 can include a disk system for persistently storing information maintained by the system 100. The information can describe users and items. The database also stores observation samples and models, which infer abstract relationships of the observations.

Figure 2:
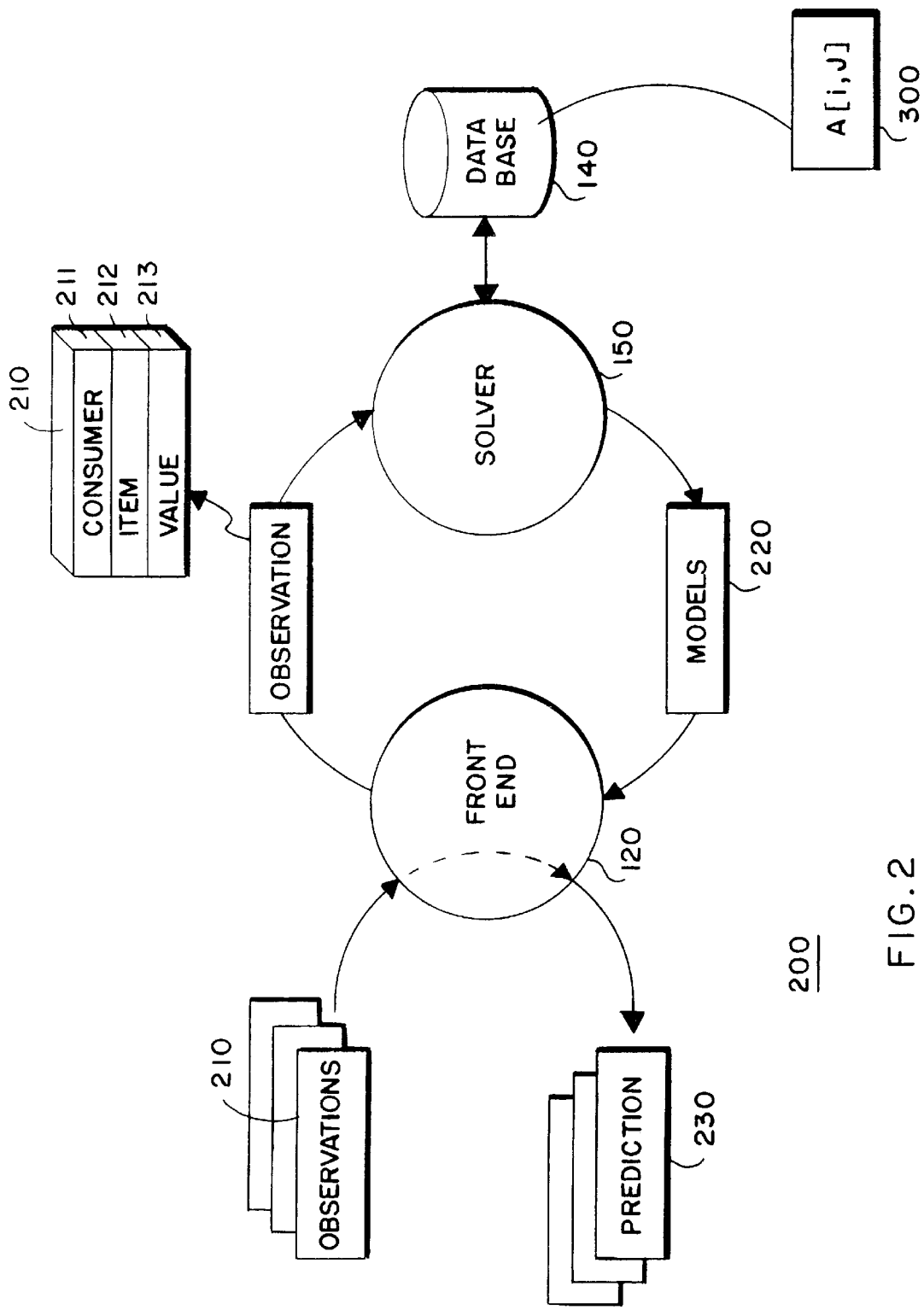
FIG. 2 shows a flow diagram of the system of FIG. 1.

FIG. 2 shows a data flow 200 of the system of FIG. 1. Using the front end 120 of the client 110, users make observations 210 about items. Each observation 210 identifies a particular user 211, a particular item 212 about which the user is making the observation, and a value 213. The value 213 indicates the user's preference for the item. The value 213 can be expressed as a scalar quantity. The observations 210 are forwarded to the server 130 via the network 125.

The observations 210 are stored in the database 140 of the server 130. For example, the observations 210 are maintained as a matrix 300. For each entry A [i, j], "i" indicates a particular user, and "j" particular items, and the "value" is in the range −1 to +1, or unknown. Unknown is a special value when a user has not yet provided an explicit observation about an item.

The solver 150 recognizes patterns in the observations 210 stored in the database 140. The patterns, using statistical inference and filtering techniques, for example, factor analysis, are reduced to models 220. In essence, the models 220 are an abstraction of the observations 210. The models 220 do not contain any information about the individual observations 210. Instead, the models 220 can be in the form of multi-dimensional matrices which categorize items according to preferences by users.

For example, the factor analysis proceeds by performing a singular-value decomposition of the matrix 300, where the unknowns are treated as "don't cares." The matrix can be filled out by taking the "dot" product of the vector values for known users and items. More particularly, the matrix 300 is fully populated such that there is one entry for each user and for each item recorded in the database 140. This process can be simplified by assuming that the observations are "noisy." If the observations are assumed to be noisy, then low-dimensional vectors can be used to approximately represent known values.

The factor analysis is most efficiently performed by an iterative process, which approximates solutions for the unknown values as the matrix 300 is being updated with additional observations. Thus, the present implementation adapts the models to continuous user feedback.

The models 220 are distributed back to the client 120. Using the models 220, the client 120 can subsequently make predictions 230 as additional observations 220 are received. The predictions 230 indicate items which are likely be of interest to particular users based on observations made about the items by other users. In other words, the client 120 can make predictions without directly interacting with the server 130 or database 140.

Over time, users can enter additional observations 210. As the additional observations are entered in the database 140, the models 220 are adjusted. Accordingly, incremental observations yield incremental adjustments to the system's recommendations on items.

In the system as shown in FIGS. 1 and 2, the analysis and prediction phases are separated. The analysis is performed centrally, and the predictions are performed in a distributed manner. This makes the system 100 scaleable. Scaleable means that the size of the system can be increased without substantially changing the architecture of the system. In addition, predictions can be made for users without having access to the observations.

Clients 120 can be configured as kiosks where users are likely to acquire items, for example, record and video stores. Also, the clients can be any PC which can be connected to the network 125. This has the advantage that the predictions can securely be made in the client computer without interaction with the server computer 130. In the later configuration, predictions can be made about network content items such as the pages of the World Wide Web.

As another feature, the analysis is performed in the background asynchronously while the system interacts with users to acquire additional observations, or make new predictions. In other words, the models are continuously updated as users enter new observations about items.

The factor analysis technique as described herein is more powerful than techniques which explicitly profile users and items. First, factor analysis can substantially approximate explicit profiling. Second, factor analysis does not use fixed categorizations for the items. Categories can change over time in response to user feedback. This technique is more effective than those using fixed categories and explicit user profiles.

The distributed architecture as described herein is an improvement over centralized architectures because a larger number of realizations are possible, at lower costs and greater convenience.

The invention is described using specific terms and examples. It is to be understood that various other adaptations and modifications may be made within the spirit and scope of the invention. Therefore, it is the object of the appended claims to cover such all such variations and modifications as come within the true spirit and scope of the invention.

I claim:

1. A computerized method for predicting a particular person's preferences for items based on observations made about the items by other persons, comprising:

at a plurality of client computers, collecting observations of the items by the other persons, and passing observation data corresponding to the observations to a server computer;

at the server computer, analyzing the observation data from the client computers to generate a model of the observations, and distributing copies of the model to the plurality of the client computers; and at a particular one of the client computers associated with the particular person, receiving the model from the server computer, and predicting the preference of the particular person for a particular one of the items using the model.

2. The method of claim 1, including at the server computer, repeatedly refining the model as additional observation data is received from the client computers, and distributing the refined model to the client computers.

3. The method of claim 2, including the client computers, associated with various ones of the persons, receiving the model from the server computer, and predicting the preference of the persons associated with the client computers for each of a plurality of the items using the model.

4. The method of claim 1, wherein the observation data includes information identifying the persons associated with a particular observations about the items, information identifying the items, and scores indicating relative preferences for the items by the persons.

5. A distributed computer system, for predicting a particular person's preferences for items based on observations made about the items by other persons, comprising:

a server computer;

a plurality of client computers for collecting observations of the items by the other persons and for passing observation data corresponding to the observations to the server computer;

the server computer including a database for storing the observation data from the client computers and apparatus for analyzing the observation data from the client computers to generate a model of the observations and for distributing copies of the model to the plurality of the client computers; and the client computers including prediction means for receiving the model from the server computer for using the model to predict the preference of the particular person for a particular one of the items using the model.

6. The system of claim 5, wherein the server computer apparatus includes apparatus for repeatedly refining the model as additional observation data is received from the client computers, and for distributing the refined model to the client computers.

7. The system of claim 6, wherein the prediction means in the client computers is configured to be predicting the preferences of a plurality of different ones of the persons for each of a plurality of the items using the model.

8. The system of claim 5, wherein the observation data includes information identifying the persons associated with a particular observations about the items, information identifying the items, and scores indicating relative preferences for the items by the persons.

9. A computer program product for use in conjunction with a plurality of computers in a distributed computer system, the computer program product comprising a computer readable storage medium and a computer program mechanism embedded therein, the computer program mechanism comprising:

an observation collection module, for execution by each of a plurality of client computers in the distributed computer system, for collecting observations of the items by the other persons, and passing observation data corresponding to the observations to a server computer in the distributed computer system;

a server module, for execution by the server computer, for analyzing the observation data from the client computers to generate a model of the observations, and for distributing copies of the model to the plurality of the client computers; and a prediction module, for use at a particular one of the client computers associated with the particular person, for receiving the model from the server computer, and for predicting the preference of the particular person for a particular one of the items using the model.

10. The computer program product of claim 9, wherein the server module includes instructions for repeatedly refining the model as additional observation data is received from the client computers and for distributing the refined model to the client computers.

11. The computer program product of claim 10, wherein the prediction module is for use the client computers, associated with various ones of the persons, and including instructions for predicting the preference of the persons associated with the client computers for each of a plurality of the items using the model.

12. The computer program product of claim 9, wherein the observation data includes information identifying the persons associated with a particular observations about the items, information identifying the items, and scores indicating relative preferences for the items by the persons.

* * * * *

UNITED STATES PATENT AND TRADEMARK OFFICE
CERTIFICATE OF CORRECTION

PATENT NO. : 6,078,740  
DATED : June 20, 2000  
INVENTOR(S) : DeTreville

Page 1 of 1

It is certified that error appears in the above-identified patent and that said Letters Patent is hereby corrected as shown below:

Column 5,
Line 10, before "the client computers," add -- at --;

Column 6,
Line 36, after "the prediction module is for use" add -- at --.

Signed and Sealed this

Fourteenth Day of August, 2001

Attest:

*Nicholas P. Godici*

*Attesting Officer*

NICHOLAS P. GODICI
*Acting Director of the United States Patent and Trademark Office*